Patented July 13, 1937

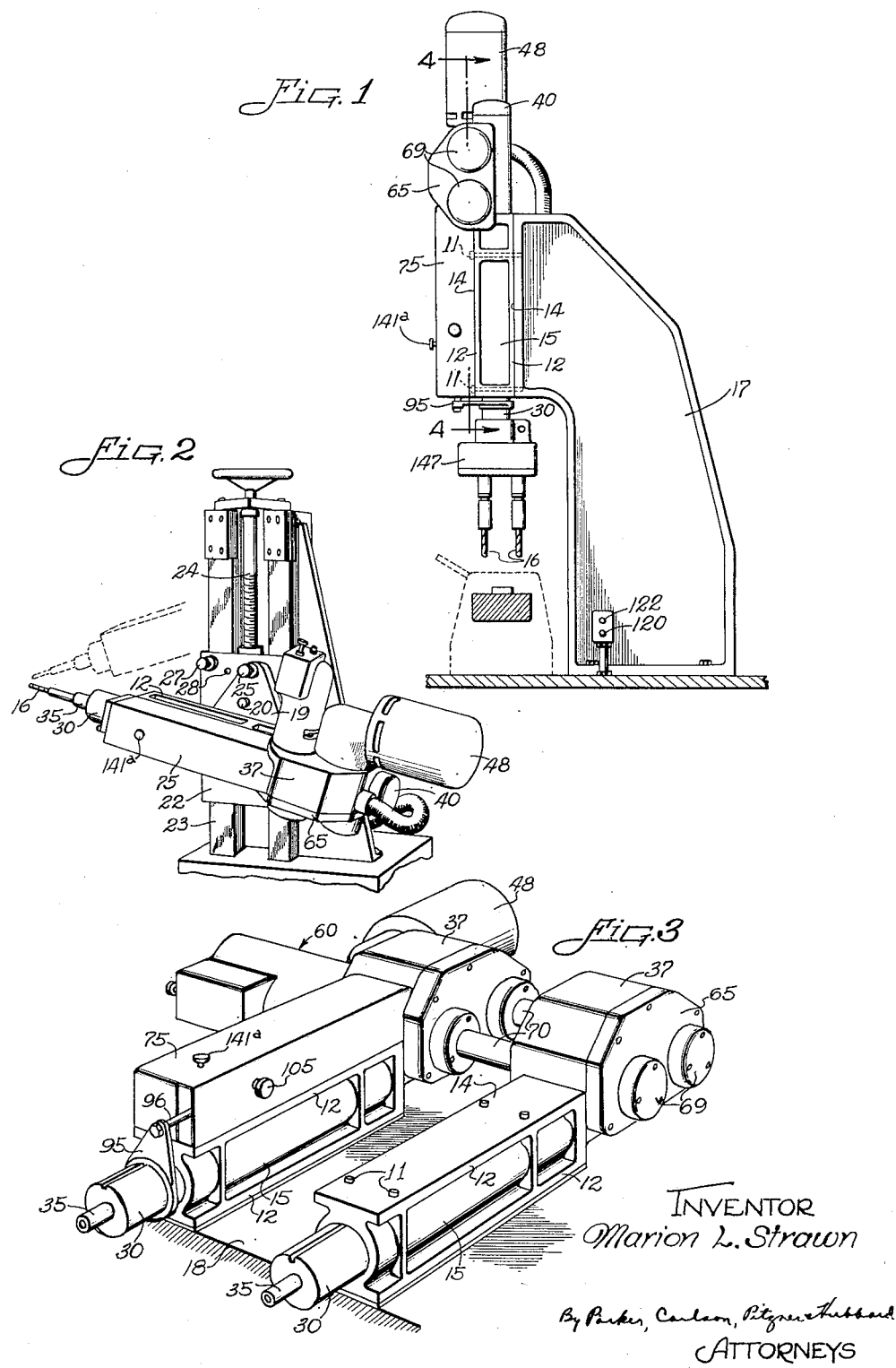

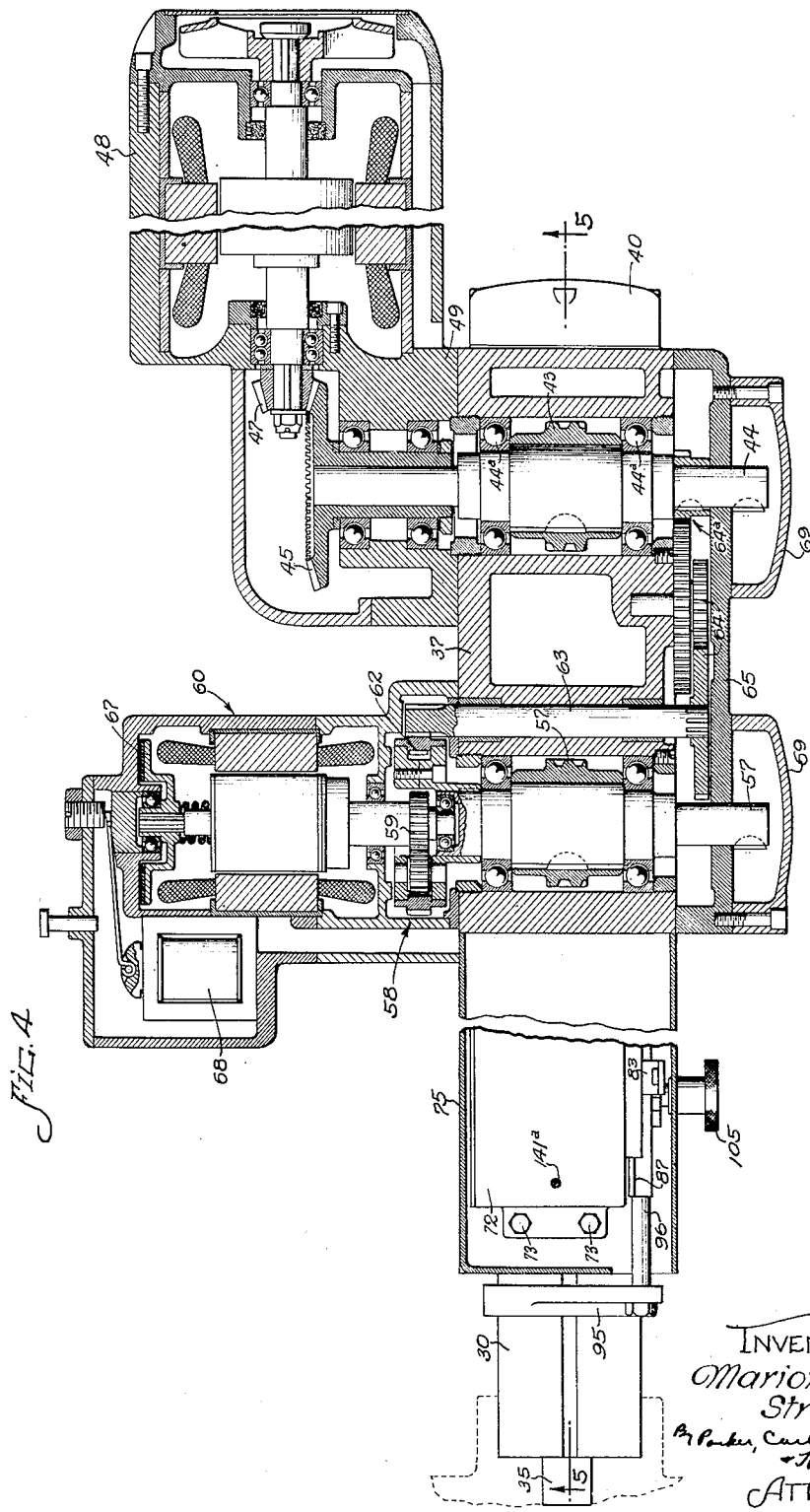

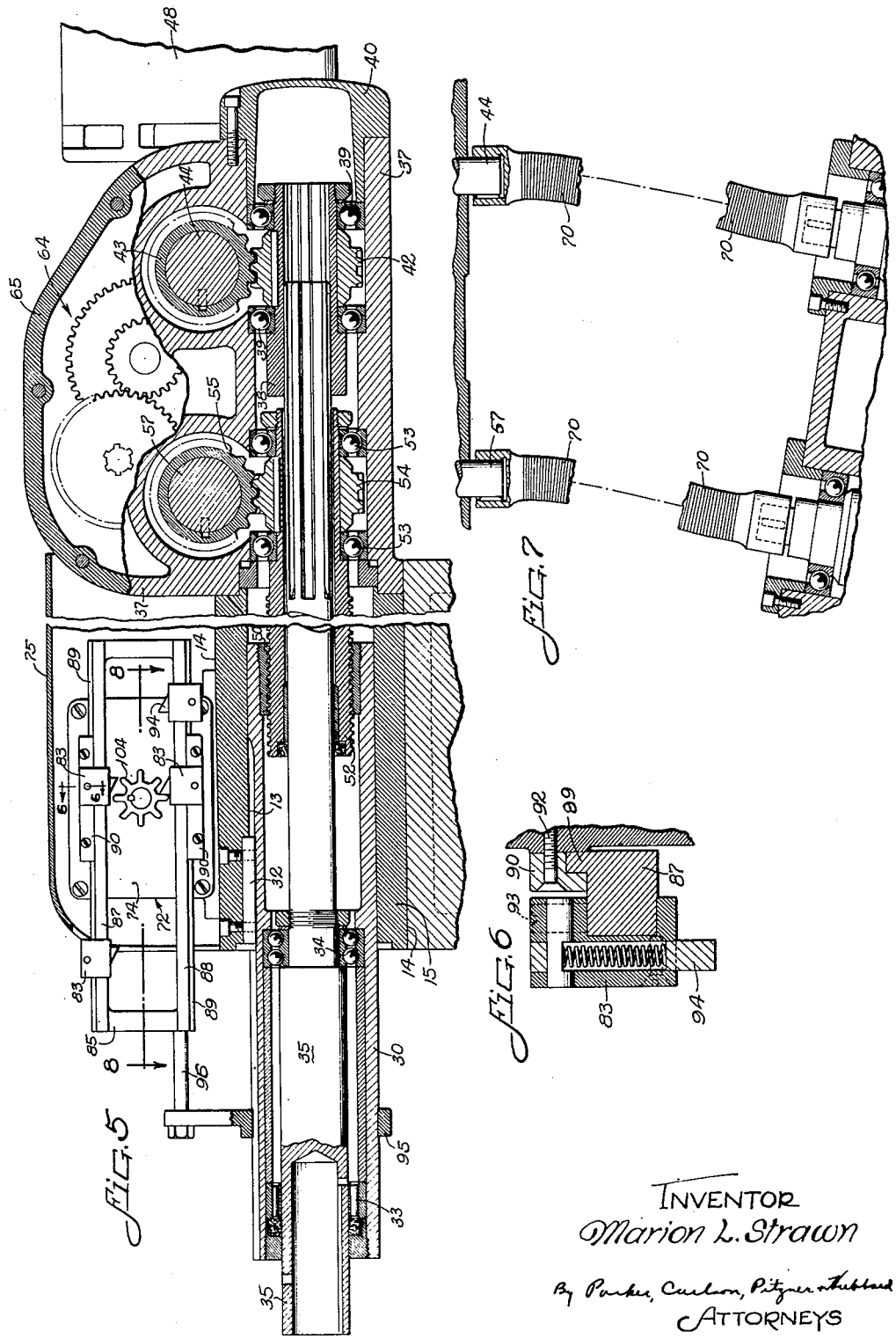

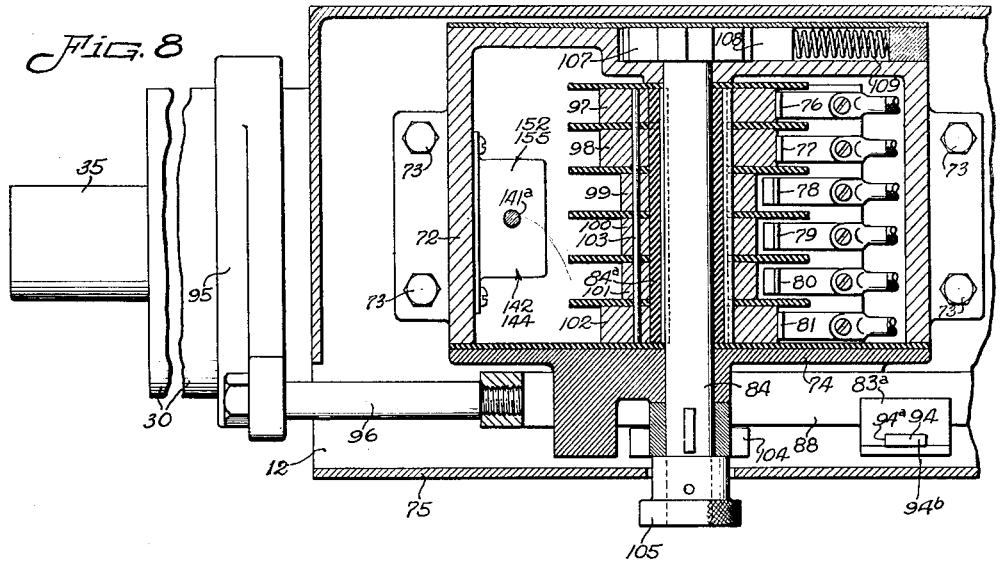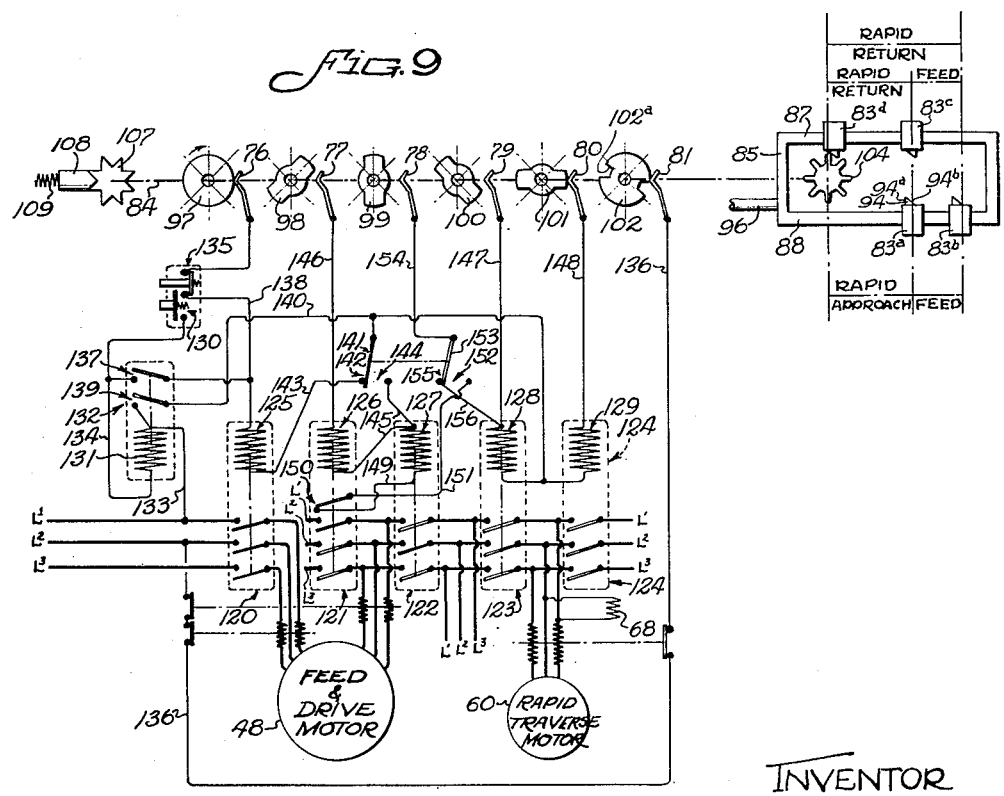

2,086,583

UNITED STATES PATENT OFFICE 2,086,583

MACHINE TOOL

Marion L. Strawn, Rockford, Ill., assignor to The Ingersoll Milling Machine Company, Rockford, Ill., a corporation of Illinois Application April 8, 1935, Serial No. 15,218

22 Claims. (Cl. 29—26)

This invention relates to machine tools for performing various metal-removing processes such as drilling, tapping, boring, reaming, and the like.

One object of the invention is to provide a new and improved self-contained tool driving and feeding unit which may be mounted on supporting structures in a wide variety of positions to establish any desired line of approach of a tool to a work piece and which may be arranged for quick and convenient change of the line of tool approach.

Another object is to provide a self-contained unit of the above character having a tool driving and feeding mechanism from which driving connections may be extended to an independently mounted unit so that the tool of the latter may be rotated and fed by the driving means of the first unit.

A further object is to provide a combined tool and feed unit having a novel cycle control mechanism which may be adapted selectively for defining different types of automatic machine tool cycles.

The invention also resides in the novel character of the means by which the power driving mechanism is controlled to define the automatic cycles.

Other objects and advantages of the invention will become apparent from the following detailed description taken in connection with the accompanying drawings, in which Figure 1 is an elevational view of a machine tool embodying the features of the present invention.

Fig. 2 is a perspective view showing another manner of mounting the tool unit.

Fig. 3 is a perspective view illustrating the manner by which several units may be coupled together.

Fig. 4 is a sectional plan view through the tool unit.

Fig. 5 is a sectional view taken along the line 5—5 of Fig. 4.

Fig. 6 is an enlarged fragmentary sectional view taken substantially along the line 6—6 of Fig. 5.

Fig. 7 is a fragmentary view partly in section showing a modified form of coupling between adjacent units.

Fig. 8 is a fragmentary sectional view taken substantially along line 8—8 of Fig. 5.

Fig. 9 is a schematic view and wiring diagram.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

By way of illustration, the invention is shown in the drawings as embodied in machine tools for effecting various metal-removing processes each comprising a self-contained tool drive and feed unit particularly adapted for a high degree of versatility with respect to the type of support upon which it may be secured or the line of approach which may be obtained. To this end, the unit embodies an elongated tubular guide member 15 adapted by its axial position to define the line of approach of a tool 16 toward the work and constituting the means by which the unit is attached to a suitable support to form a complete machine tool. Preferably, this guide member is tubular in form having a plurality of flattened exterior surfaces 14 adapted to be clamped against the flat surface of a suitable support. Herein, the member 15 comprises an annular tube providing an internal cylindrical guide surface 13 and having plates 12 formed integral therewith to define the surfaces 14. Attachment of the member to its support may be accomplished by bolts 11 extended through holes along the side edges of the plates 12.

Where a vertical line of tool approach is desired, the unit may be secured in vertical position on a column 17 as shown in Fig. 1. If a one-way horizontal machine is required, the unit may be mounted on a base 18 as shown in Fig. 3.

A substantial saving in equipment can often be effected by mounting the unit for ready change from one line of tool approach to another, such as from the full line position to the broken line position shown in Fig. 2. To the accomplishment of this purpose, the guide member 15 may be secured to means by which it may be shifted as desired. As shown, this means may comprise a swivel plate 19 connected by a pivot 20 to a saddle 22 mounted to travel on rails 23 or other suitable standard. Means such as a manually operable screw 24 is provided for moving the saddle to thereby shift the guide member bodily and establish a desired line or angle of approach.

In order to maintain the unit positively in adjusted position, manually operable means such as retractible plungers 26 and 27 may be mounted on the swivel plate 19 and the saddle 22 respectively. After retraction of the plunger 25, the plate 19 may be swung to locate the unit as shown in dotted outline in Fig. 2 in which position the plunger 25 will engage in a suitable depression 28 and thereby maintain the unit accurately located. Similarly, the plunger 27 is engageable in a suitable depression (not shown) after the base plate has been shifted to the desired position by turning the screw 24.

The tool 16, which may be a drill, tap or other cutting tool, is carried by a spindle 35 journaled in a slide element which is projectible from one end of the guide member 15 to effect axial feeding of the tool. As herein shown, a sliding element is formed as a sleeve 30 slidably received in the interior of the guide member. Means such as a feather key 32 prevents rotation of the sleeve but permits free endwise movement thereof. The spindle 35 is axially journaled in bearings 33 and 34 in the sleeve 30 and the end which projects from the sleeve is suitably equipped with a bore to receive interchangeably a chuck or collet in which drilling or tapping tools may be mounted.

Rotary motion for driving the spindle, and power for reciprocating the sleeve 30 at feed and rapid traverse speeds in a rectilinear path is supplied by a suitable electric power source through the medium of power transmission mechanism contained within a housing 37 (Fig. 5) formed as a casing which is secured in proper fashion to the rear end of the guide member 15. Herein, the power transmission mechanism includes an internally splined sleeve 38 rotatably mounted in the housing 37 coaxially with the spindle 35 and held against axial movement by bearings 39. The end of the spindle is splined for relative axial movement in the sleeve 38, a removable cap 40 providing a chamber for receiving the end of the spindle when the latter is fully retracted within the machine. The sleeve 38 has keyed thereon a spiral gear 42 engageable with a gear 43 carried by a cross shaft 44 which extends transversely of the spindle through the housing 37 and is journaled in bearings 44a. Fast on one end of the shaft is a bevel gear 45 (Fig. 4) meshing with a bevel pinion 47 on the drive shaft of a two speed reversible feed and drive motor 48 the housing of which is removably secured through the medium of a bracket support 49 to one side of the housing 37 with the motor axis disposed parallel to that of the tool spindle.

The means for feeding the sleeve 30 endwise to move the tool toward and from the work includes a nut 50 rigid with the rear end of the sleeve and threading onto a tubular feed screw 52 which surrounds the spindle 35 and extends into the housing 37 where it is held against axial movement by bearings 53. A spiral gear 54 keyed on the screw engages with and is driven by a gear 55 on a cross shaft 57. Rotation of this shaft is effected through planetary gearing 58, the sun gear 59 of which is connected to the drive shaft of a reversible rapid traverse motor 60 demountably carried by the housing 37. The ring gear 62 is connected for actuation by the feed motor 48 through the medium of a counter-cross-shaft 63 geared to the outer periphery of the ring gear and connected at its other end through appropriate pick-off gears 64 and gearing 64a to the shaft 44. Preferably the gears 64 are disposed on the side of the housing 37 opposite the motor and may be exposed by removal of a detachable cover 65 to permit changing of the gears for establishing the feed rate required for the metal-removing operation to be performed.

It will be observed that the feed screw may be rotated by operation of either of the motors 48 and 60, and that it will advance the nut 50 in a direction and at a speed corresponding to that of the operating motor as modified by the transmission gearing, thereby causing corresponding endwise motion of the sleeve 30. When the feed motor 48 alone is operating, the rapid traverse motor 60 is held against rotation by suitable means such as a spring applied friction brake 67 arranged to be released by a solenoid 68 which is energized whenever the rapid traverse motor is excited.

The present invention contemplates that a plurality of self-contained machine units may be coupled for simultaneous operation and that the same power driving means, herein the motors 48 and 60, connected with one of the machine units shall be effective to actuate all the units thereby attaining a substantial saving in equipment. For this purpose, the shafts 44 and 57 are arranged in parallel relation and terminate on one side of the unit so that the rotary feed and traverse motion and the rotary tool drive can be extended conveniently to another self-contained unit. To this end, the ends of the shafts are equpped with elements of shaft couplings which may be exposed by removal of detachable covers 69 which may be connected through the medium of shafts 70 (Figs. 3 and 7) to the ends of the corresponding shafts of an adjacent parallel unit. Where circumstances demand that the line of approach of the coupled units be different while the operation is simultaneous, an arrangement embodying a universal coupling may be used. A convenient coupling of this nature may be formed by employing flexible shafts as shown in Fig. 7.

By removal of the cover 65 and the cap 40, it will be observed that the spiral gears 42 and 44 may be removed to permit the substitution of other gears for effecting any desired change in the rate of tool drive. This provision together with the pick-off gears 64 enables the feed and drive speeds for any desired operation to be obtained.

Incorporated in the self-contained unit is a mechanism for controlling the selective operation of the motors 48 and 60 to define automatic cyclic movements of the spindle sleeve 30. In keeping with the present tool organization whereby the various parts are demountably carried by the common support furnished by the member 15, this mechanism may be formed as a structurally separate sub-assembly having all of its parts carried by a box 72 detachably secured upon one face of the sleeve 15 as by bolts 73 (Fig. 8) and closed by a removable end wall 74. A hood 75 encloses the box and associated mechanism.

In the present instance, a single control mechanism may be employed for governing both motors to define automatically either a normal drilling cycle comprising rapid approach, feed and rapid return motions of the spindle sleeve; or a tapping cycle comprising rapid approach, feed, reverse feed and rapid return motions. To this end, the cycling mechanism comprises a series of stationary spring contacts 76 to 81 (Figs. 8 and 9) cooperating with cams 97 to 102 on a shaft 84 to form switches governing the motor circuits selectively to define different parts of the cycles the lengths of which parts are determined by a series of relatively adjustable dogs 83 spaced according to the lengths of the cycle parts.

The dogs operate in response to movement of the spindle to advance the selector element or cam shaft 84 unidirectionally with a step-by-step motion through a plurality of different positions in which the switches are conditioned for producing the different feed and rapid traverse motions.

Herein the dogs 83, which operate to determine the points in the movement of the spindle at which different parts of the cycle are initiated and terminated, are mounted on an elongated carrier 85 having parallel rails 87 and 88 with edge flanges 89 slidable in guides 90 on the wall 74 (Fig. 5). Herein two of the dogs are mounted on the rail 88 and serve to terminate the rapid approach and feed movements. The other two dogs on the rail 87 terminate the rapid return motion and the reverse feed motion in a tapping cycle. As seen in Fig. 6, the dogs may be similarly constructed and each comprises a slotted block on the rail secured in adjusted position by a set screw 93. Each dog carries a yieldable detent or pawl 94 for a purpose that will presently appear.

The means for rigidly connecting the sliding frame and the spindle sleeve 80 is herein shown as comprising a removable clamp 95 fixedly embracing the projecting end of the sleeve and rigidly connected to one end of the carrier 85 through the medium of a rod 96 (Figs. 5 and 8). The carrier is thus guided for movement with the sleeve.

Herein the cams 97 to 102 are mounted on an insulating sleeve 84ᵃ surrounding the shaft 84 and are electrically connected by means such as a rod 103 (Fig. 8).

In order to effect unidirectional step-by-step rotation of the shaft 84, it is disposed between the rails 87 and 88 and near one end carries a ratchet wheel 104 the teeth of which are adapted to be engaged by the leading surfaces 94ᵃ of the pawls 94. When the inclined trailing surface 94ᵇ of a pawl engages a tooth of the ratchet wheel, the pawl is cammed out of the way and passes the ratchet wheel without advancing the latter. Thus, when the carrier moves in one direction, one pair of dogs is operative progressively to engage successive ratchet teeth to advance the wheel, and when the carrier is moved in the other direction, the other pair of dogs becomes similarly operative. Manual means may be provided for rotating the shaft independently of the dogs for adjusting the setting of the cams relative to the switch contacts, this means being shown as a knurled knob 105. If desired, the knob may be equipped with indicia to show at a glance the position of the cam shaft.

Means may be provided for quickly completing each movement of the cam shaft, herein comprising a star wheel 107 secured fast upon the shaft and having a wedge-shaped plunger 108 urged into engagement therewith by a spring 109, so that after the shaft has been actuated by movement of the ratchet wheel through a predetermined part of one step, the end of the plunger will ride over-center with respect to one of the star teeth and act as a cam thereon to complete the step of movement with a snap action and thereafter maintain the cam shaft position. The cams are shaped to open or close the switches of which they form a part in this rapid portion of the cam shaft movement.

The motors 48 and 60 are connected as shown in the wiring diagram (Fig. 9) for energization from the power lines L, L², and L³ by magnetic relay switches 120, 121, 122, 123, and 124 which are closed by energization of coils 125, 126, 127, 128, and 129 respectively. The rapid traverse motor runs in a direction to advance the tool spindle forwardly when the coil 129 is energized and in the opposite direction when the coil 128 is active. When the coil 125 is energized, a slow speed winding of the feed motor 48 is energized, and the latter runs in a direction to advance the tool forwardly at a rate suitable for drilling. For tapping operations where it is desirable to feed the tool at a higher rate relative to the speed of rotation, a high speed winding of the motor 48 is excited either by energization of the relay coils 126 and 127 which cause forward and reverse feed of the tool respectively. In both cycles, the coil is controlled by the cam switch 77, 98.

Each cycle is initiated by closure of a normally open push button switch 130 which completes a circuit for energizing the coil 131 of a relay 132 extending from the conductor L¹ through a conductor 133, the coil 131, a conductor 134, the switch 130, a normally closed push button switch 135, the contact 76, the disk 97, the rod 103 (Fig. 8), the cam 102, the contact 81, a conductor 136 leading to the line L². After the relay 132 has been energized, its circuit is maintained independently of the switch 130 by a switch 137 the terminals of which are connected to the conductor 134 and a conductor 138 extending from the coil 125 to the stop switch 135. The energizing circuits for all of the motor control relays extend through a switch 139 which is closed when the coil 131 is energized and has a contact connected to the conductor 133 and a movable contact connected to a conductor 140 which leads to the common terminal of the relay coils 128 and 129.

For a purpose to appear later, manually operable switching means 141ᵃ is provided for rendering either the low speed coil 125 or the high speed coil 126 of the feed motor operative. To this end, the conductor 140 is connected to the manually movable contact 141 of a switch 142 the stationary contact of which leads through a conductor 143 to the coil 125. The contact 141 cooperates with a second contact to form a switch 144 joined to the coil 126 by a conductor 145 which is also connected to the coil 127 so that when the switch 144 is closed, the coils 126 and 127 will be operative. The contacts 77, 79, and 80 of the cam operated switches are connected by conductors 146, 147, and 148 to the coils 126, 128, and 129 respectively. One terminal of the coil 127 is joined by a conductor 149 to the stationary contact of a switch 150 which is closed when the relay 121 is deenergized, the movable switch contact being connected by a conductor 151 to the stationary contact of a switch 152 having a movable contact 153 joined to the contact 141 for actuation jointly therewith. When the switch 152 is closed, the coil 127 will be connected by the conductor 151 and a conductor 154 to the contact 78. In the other position of the contact 153 as shown in Fig. 9, a switch 155 will be closed thereby connecting the contact 78 to the coil 128 through the medium of the conductor 154 and a conductor 156. Thus, when the switch 155 is closed, the coil 128, which initiates rapid return of the tool, may be energized by closure of either of the switches 78, 99 and 79, 100, but when the switch 152 is closed, the switch 78, 99 will control the coil 127 by which reverse feed of the tool is produced. The switches 144 and 152 may be disposed within the housing 75 and their contacts arranged to be shifted in any preferred manner.

For a drilling cycle, the operation is as follows, the switches being conditioned by their cams as shown in Fig. 9. The cycle is started by closure of the starting switch 130 which completes an energizing circuit for the relay 132. The resulting closure of the switch 139 establishes an energizing circuit for the coil 125 extending from the lead $L^1$ through the conductor 133, the switch 139, the conductor 140, the switch 142, the conductor 143, the coil 125, the conductor 138, the stop switch 135, the contact 76, the cams 97 and 102, the contact 81, the conductor 136 to the lead $L^2$. The relay switch 120 is thus closed applying current to the feed motor 48. Since the cam 101 is then in engagement with the contact 80, an energizing circuit through the coil 129 is also closed starting the motor 60, rapid approach movement of the spindle being produced by the combined operation of the two motors.

During the approach movement, the carrier 85 will be carried to the left as seen in Fig. 9 until the first dog 83a engages the ratchet wheel 104 and turns the same one notch so that the cams are moved in their first stepping movement to disconnect the cam 101 from the switch contact 80 and interrupt operation of the rapid traverse motor 60, whereupon the feed motor continues to drive the tool and advance the same into the work at the proper speed for drilling. As the dogs 83d and 83c pass the ratchet wheel, their pawls 94 are depressed and pass the ratchet teeth without effect. When the dog 83b becomes effective to advance the cam shaft in the second stepping movement, the cam 99 contacts the contact member 78 closing a circuit from the conductor $L^2$ through the conductor 136, the contact 81, the cam 102, the conductor 103, the cam 99, the contact 78, the conductor 154, the switch 155, the conductor 156, the coil 128, the conductor 140, the switch 139, the conductor 133 to the power line $L^1$. The relay switch 123 is thus closed to start rapid return movement of the spindle by the traverse motor 60. During the ensuing rapid return movement of the spindle, the dog 83c causes a third advance of the cam shaft 84 to shift the cam 99, simultaneously opening its switch and moving the cam 100 into contact with the member 79 which is also connected with the coil 128 so that relay switch 123 remains closed and the rapid return movement of the motor 60 continues until the cam shaft is moved to its fourth position by the dog 83d. In this last advance, a notch 102a in the cam 102 is presented momentarily to the contact 81 thereby breaking the sealing circuit of relay coil 131 through the switch 137 causing the switch 139 to be opened and the operation of both motors to be interrupted.

To condition the machine tool for performing a tapping operation, the contacts 141 and 153 are shifted manually to close the switches 144 and 152 thereby transferring the initial control of the rapid traverse motion from the dog 83b to the dog 83c and also placing the feed motions under the control of the switches 139 and 78, 99. Also, the pick-off gears 64 and if necessary the gears 42 and 44 are changed to provide the proper tool drive and feed rates.

When the start switch 130 is closed to cause the relay coil 134 to be energized and the rapid traverse motor 60 to be started in the manner above described, the feed motor 48 will not become operative immediately. At the end of the rapid approach, the dog 83a will actuate the ratchet 104 to move the cam shaft through its first stepping movement. Thereupon, operation of the rapid traverse motor is interrupted by the cam 101, and the cam 98 engages the switch contact 77. A circuit is thus closed through the contact 77, the conductor 146, the coil 126, the conductor 145, the switch 144, the conductor 140 and the switch 139. Tapping then occurs in the rotation of the tap and advance of the spindle which are produced in synchronism by the feed motor 48.

In the second step of movement of the cam shaft, which is produced by engagement of the pawl of the dog 83b with the ratchet 104, the switch contact 77 rides off the cam 98, and the cam 99 engages the switch contact 78 causing the coil 127 to be energized. The circuit extends through the contact 78, the conductor 154, the switch 152, the conductor 151, the switch 150, the coil 127, the switch 144, the conductor 140, and the switch 139. The directions of rotation and feed of the tap are thus reversed by the motor 48, the taps being withdrawn from the work at feed speed. As the tool leaves the work, the dog 83c engages the ratchet wheel 104 and advances the cam shaft in its third step, the switch contact 78 riding off the cam 99 to interrupt operation of the feed motor and the contact 79 engaging the cam 100 closes the circuit for the coil 128 thereby initiating the rapid return operation of the traverse motor 60. The tapping cycle is then terminated automatically in the fourth movement of the cam shaft which is produced by the dog 83d and in which the operating circuit is momentarily broken as the notch in the cam 102 passes the switch contact 81.

Ordinarily the present self-contained machine unit above described will find its chief use in single spindle tool operations but where desired the spindle sleeve 30 may be adapted to support a plurality of tools. As shown in Fig. 1, for example, a multiple tool head 147 may be secured on the end of the spindle sleeve, rotary motion of the spindle 35 being imparted synchronously in any usual manner to the various tools.

From the foregoing, it will be observed that the present invention provides an efficient self-contained convertible machine tool organization of simple and inexpensive construction having a high degree of versatility in the matter of mounting. The machine is readily adaptable to any desired line of approach to the work, is automatic and positive in operation and embodies mechanism which may be changed conveniently to vary the fundamental operative cycles to be executed. Moreover, one self-contained unit is operable as an entity or it may serve as one of a battery of similar units, the drive of the motors being extended mechanically to an adjacent unit the cost of which is thus reduced to a minimum.

I claim as my invention:

1. A self-contained tool drive and feed unit having, in combination, a tubular guide member providing an elongated internal cylindrical guide surface and having a plurality of flat external surfaces each adapted to be clamped in selected positions against a supporting surface, a tubular slide member reciprocable within said guide member, a tool spindle projecting from one end of said slide member and rotatably journaled therein, and power driven mechanism supported from said guide member at the end thereof opposite said tool spindle and arranged to impart rotary motion to said spindle and reciprocatory motion at different speeds to said slide member.

2. A self-contained tool drive and feed unit having, in combination, a tubular guide member providing an elongated internal cylindrical guide surface and having an external surface adapted to be clamped against a supporting surface, a tubular slide member reciprocable within said guide member, a tool spindle projecting from one end of said slide member and rotatably journaled therein, and power driven mechanism stationarily supported from said guide member at the end thereof opposite said tool and arranged to impart rotary motion to said spindle and reciprocatory motion at different speeds to said slide member.

3. A self-contained tool drive and feed unit having, in combination, a tubular guide member providing an elongated internal guide surface and having an external surface adapted to be clamped against a supporting surface, a slide member reciprocable within said guide member, a tool spindle rotatably journaled therein, and power driven mechanism supported from said guide member at the end opposite said tool spindle and arranged to impart rotary motion to said spindle and reciprocatory motion at different speeds to said slide member.

4. A self-contained tool drive and feed unit comprising, in combination, an elongated tubular guide member having a cylindrical internal guide surface and arranged to be clamped detachably to a support, an elongated sleeve within said member held against rotary movements and guided by said guide surface for endwise movement, one end portion of said sleeve projecting beyond one end of said guide member, a tool spindle projecting from said end portion and mounted in said sleeve for rotation relative thereto and for axial movement therewith, a casing rigidly mounted on the opposite end of said guide member, electric motor driving means supported by said casing and having a spline drive connection with said spindle disposed within said casing, a nut fixed on said sleeve near the rear end thereof, a rotatable tubular screw surrounding said spindle and threading into said nut, and mechanism for extending the drive of said driving means through said casing and imparting rotary motion to said screw at feed and rapid traverse rates.

5. A self-contained tool drive and feed unit comprising, in combination, an elongated tubular guide member having an internal guide surface and arranged to be clamped detachably to a support, an elongated slide guided by said surface for endwise movement and projecting beyond one end of said guide member, a tool spindle projecting from said slide and mounted thereon for rotation relative thereto and for axial movement therewith, electric motor driving means supported from the opposite end of said guide member and having a drive connection with said spindle, a feed element fixed to said slide, a cooperating rotary feed element, and mechanism for extending the drive of said driving means to said rotary feed element at feed and rapid traverse rates.

6. A self-contained tool driving and feed unit having, in combination, an elongated guide member having an internal guide surface, an elongated slide member within said guide member projecting from one end thereof and guided therein for endwise reciprocation, a tool spindle projecting through said slide member and rotatably journaled therein, power driven mechanism at the other end of said guide member for imparting rotary motion to said spindle and reciprocatory motion at different speeds to said slide member, means controlling said power mechanism to define cycles of feed and rapid traverse motions of said slide member, and actuating means for said control means connected to the projecting end of said slide member.

7. A machine tool having, in combination, a stationary member providing an elongated guideway, a rotary spindle carrying a tool at one end and mounted for reciprocation longitudinally of said guideway, a shaft rotatable about a fixed axis extending transversely of said spindle and having a rotary driving connection with the spindle and a coupling element at one end, mechanism for imparting endwise feeding movements to said spindle, a shaft extending transversely of said spindle and having a driving connection with said feed mechanism and a coupling element at one end, electric motor means having rotary driving connections with the other ends of said shafts, a second rotary spindle spaced from said first spindle and mounted independently for endwise reciprocation, feeding means associated with said second spindle for imparting endwise movements thereto, and two shafts respectively coupled to said elements and extending the drive from said first mentioned shafts to said second spindle and said feeding means respectively.

8. In combination in a machine tool organization, a pair of self-contained tool drive and feed units having individual tool-carrying spindles independently mounted for axial movement and for rotation about their axes, mechanical power transmission mechanism supported by each unit and arranged to impart rotary and endwise motions to said spindles, power driving means carried by one of said units and operatively connected to the transmission mechanism thereof, and means operatively joining the transmission mechanisms of both units for jointly actuating said individual spindles by the power derived from said driving means.

9. In combination in a machine tool organization, a pair of tool drive and feed units having individual tool-carrying spindles independently mounted for axial movement and for rotation about their axes, mechanical power transmission mechanism supported by each unit and arranged to impart rotary and endwise motion to said spindles, said mechanisms each including a pair of rotary parallel shafts, and means actuated thereby for rotating the associated spindle and imparting endwise movements thereto, power driving means carried by one of said units for driving the shafts thereon, and means operatively connecting the corresponding cross shafts of both units for joint actuation of said spindles.

10. In combination in a machine tool organization a pair of tool drive and feed units having individual tool-carrying spindles independently mounted for axial movement and for rotation about their axes, mechanical power transmission mechanism supported by each unit and arranged to impart rotary and endwise motion to said spindles, said mechanisms each including a pair of rotary cross shafts, and means actuated thereby for rotating the associated spindle and imparting endwise movements thereto, power driving means carried by one of said units for driving the shafts thereon, and flexible shafts operatively connecting the corresponding cross shafts of said units whereby to permit of actuation of both of said spindles from said driving means regardless of the angular position of the spindles.

11. In combination in a machine tool organization, a pair of tool drive and feed units having individual tool-carrying spindles independently mounted for axial movement and for rotation about their axes, mechanical power transmission mechanism supported by each unit and arranged to impart rotary and endwise motion to said spindles, said mechanisms each including a pair of rotary cross shafts, and means actuated thereby for rotating the associated spindle and imparting endwise movements thereto, power driving means carried by one of said units for driving the shafts thereon, and means responsive to the endwise movement of one of said spindles for controlling said driving means to define an automatic cycle of rapid traverse and feed motions of both of the spindles.

12. In a machine tool organization, the combination of a pair of independently mounted tool drive and feed units each having an individual tool carrying spindle mounted for axial movement and for rotation about its axis, mechanism associated with each unit and arranged when operated to impart rotary and endwise motion to the associated spindle, power drive means having a driving connection extending to one of said units for actuating the mechanism thereof to impart rotary motion to the spindle thereof and reciprocatory motion at feed and rapid traverse rates, and flexible shafting extending the drive of said power driving means to said other unit for imparting reciprocatory motions at feed and rapid traverse rates and rotary motion to the spindle thereof regardless of the angular position of said spindles.

13. In a machine tool organization, the combination of a pair of independently mounted tool drive and feed units each having an individual tool carrying spindle mounted for axial movement and for rotation about its axis, mechanism associated with each unit and arranged when operated to impart rotary and endwise motion to the associated spindle, power drive means having a driving connection extending to one of said units for actuating the mechanism thereof to impart rotary motion to the spindle thereof and reciprocatory motion at feed and rapid traverse rates, flexible shafting extending the drive of said power driving means to said other unit for imparting reciprocatory motions at feed and rapid traverse rates and rotary motion to the spindle thereof regardless of the angular position of said spindles, and a common cycle control mechanism responsive to the endwise movements of one of said spindles for controlling said driving means to define an automatic cycle of rapid traverse and feed motions of all of said spindles.

14. A combined machine having, in combination, a tool spindle upon which different tools may be mounted interchangeably, means supporting said spindle for rotary and endwise motions to cause a metal-removing operation to be performed by the tool thereon, motor driven means for rotating said tool and imparting endwise movement thereto in opposite directions at feed and rapid traverse rates, a plurality of electric switches controlling said motor driven means to cause rapid approach, rapid return, forward feed and reverse feed movements of said spindle, selectively adjustable means for actuating said switches in response to the axial movement of said spindle to define the relative lengths of said feed and rapid traverse motions, and independent manually operable switching means by which said switches may be rendered operative selectively to define a cycle of rapid approach, feed and rapid return motions or a cycle of rapid approach, feed, reverse feed and rapid return motions.

15. A machine tool having, in combination, a tool spindle, means supporting said spindle for rotary motion and endwise motion, motor driven means for rotating said tool and imparting endwise movement thereto in opposite directions at feed and rapid traverse rates, a plurality of electric switches controlling said motor driven means to cause rapid approach, rapid return, forward feed and reverse feed movements of said spindle, a control shaft, cams thereon permanently associated with the respective switches for actuating the same, means responsive to the axial movement of said spindle to advance said shaft and define the relative lengths of said feed and rapid traverse motions, and independent selectively operable switching means by which one of said switches may be rendered operative to initiate either a feed motion or a rapid motion.

16. A machine tool having, in combination, a tool spindle, means supporting said spindle for rotary motion and endwise motion, motor driven means for rotating said tool and imparting endwise movement thereto in opposite directions at feed and rapid traverse rates, a plurality of electric switches controlling said motor driven means to cause rapid approach, rapid return, forward feed and reverse feed movements of said spindle, a control shaft having means thereon permanently associated with the respective switches for actuating the same, a plurality of dogs responsive to the axial movement of said spindle to advance said shaft and define the relative lengths of said feed and rapid traverse motions, and independent selectively operable switching means by which certain of said switches may be rendered operative to initiate either a reverse feed motion or a rapid return motion, in response to the movement of said shaft by a predetermined one of said dogs.

17. A machine tool having, in combination, a tool spindle upon which different kinds of tools may be mounted interchangeably, means supporting said spindle for rotary motion and for endwise motion, power driven means for rotating said tool and imparting endwise movements thereto in opposite directions at feed and rapid traverse rates, a plurality of control devices governing the operation of said driving means to produce rapid approach, rapid return, forward feed and reverse feed movements of said spindle, a control member movable through different positions in response to the endwise movements of said spindle and operable in said different positions to render different ones of said devices operable selectively, and selectively operable means by which the device for initiating reverse feed of the spindle will be rendered operative in a predetermined position of said member or the device for initiating rapid return of said spindle will be rendered operative in said predetermined position.

18. In a machine tool organization, the combination of a tool for performing a metal-removing operation upon the work piece, an element mounted for reciprocation to effect relative movement between said tool and work piece, a reversible electric motor arranged to rotate said tool and move said element at a feed rate, a second reversible electric motor arranged to impart movements to said element at rapid traverse rates, a switch actuated by movement of said element to a predetermined position during motion of the tool and work piece toward each other, and manually operable means by which either one of said motors may be associated selectively with said switch for initiating relative reverse feed or rapid return motions of said element.

19. In a machine tool organization, the combination of a machine tool element mounted for reciprocation to effect relative motion between a tool and work piece, means for actuating said element at a rapid traverse rate and at a feed rate including an electric motor operable at different speeds to feed said element at relatively high and low rates, means responsive to the movements of said element and controlling said driving means to define an automatic cycle of feed and rapid traverse motions of said element, and selectively operable means for causing said motor to operate in the cycle either at said high or said low rate.

20. In a machine tool organization, the combination of an element mounted for reciprocation to effect relative movement between a tool and work piece, power driven mechanism for imparting motion to said element at feed and rapid traverse rates, a member mounted for unidirectional step-by-step movements and operating in a plurality of such movements to control said mechanism and define an automatic cycle of feed and rapid traverse movements of said element, a ratchet wheel on said member, a carrier mounted for movement relative to said member in unison with the movements of said element, and pawls mounted on said carrier on opposite sides of said member, the pawl on one side of said member engaging the ratchet wheel and moving said member during movement of the carrier in one direction and the pawl on the other side of said carrier engaging the ratchet wheel and moving the member in the same direction during movement of the carrier in the opposite direction.

21. In a machine tool organization, the combination of an element mounted for reciprocation to effect relative movement between a tool and work piece, power driven mechanism for imparting motion to said element at feed and rapid traverse rates, a member mounted for unidirectional step-by-step movements and operating in a plurality of such movements to control said mechanism and define an automatic cycle of feed and rapid traverse movements of said element, a ratchet wheel on said member, two rails disposed on opposite sides of said wheel and movable in unison with said element, dogs adjustably mounted on one of said rails and adopted upon movement of said element in one direction to engage said wheel successively and advance the latter step-by-step, said dogs yielding and passing the ratchet wheel without actuation thereof upon movement of the rails in the opposite direction, and dogs adjustably mounted on the other of said rails and operating to advance the ratchet wheel only upon engagement therewith when moving in said last mentioned direction.

22. A machine tool having, in combination, a support, a casing, a non-rotatable tubular member projecting from said casing and supported therein for endwise reciprocation, a tool spindle rotatably journaled in said member and projecting from one end thereof, a power driving means within said casing arranged to rotate said spindle, mechanically acting means within said casing driven by said driving means and operating to reciprocate said member at feed and rapid traverse rates, means responsive to the endwise movements of said member to define an automatic cycle of feed and rapid traverse motions of the member, and an attachment surface on said casing by which the latter may be clamped in various positions against a supporting structure to establish a desired line of approach of said member toward a work piece to be operated upon.

MARION L. STRAWN.